United States Patent
Ogawa et al.

(10) Patent No.: US 8,328,340 B2
(45) Date of Patent: Dec. 11, 2012

(54) INK FOR INKJET PRINTING

(75) Inventors: Hiroyuki Ogawa, Ibaraki-ken (JP);
Hajime Tsunoda, Ibaraki-ken (JP);
Kazuhiro Higashi, Ibaraki-ken (JP)

(73) Assignee: Riso Kagaku Corporation, Tokyo (JP)

( * ) Notice: Subject to any disclaimer, the term of this patent is extended or adjusted under 35 U.S.C. 154(b) by 473 days.

(21) Appl. No.: 12/450,177

(22) PCT Filed: Mar. 18, 2008

(86) PCT No.: PCT/JP2008/054988
§ 371 (c)(1),
(2), (4) Date: Sep. 15, 2009

(87) PCT Pub. No.: WO2009/001589
PCT Pub. Date: Dec. 31, 2008

(65) Prior Publication Data
US 2010/0091052 A1    Apr. 15, 2010

(30) Foreign Application Priority Data
Jun. 25, 2007   (JP) .................................. 2007-166532

(51) Int. Cl.
*G01D 11/00*   (2006.01)
(52) U.S. Cl. ......................................... 347/100; 347/96
(58) Field of Classification Search ................. 347/100, 347/95, 101.96, 102; 106/31.6, 31.27, 31.13; 523/160, 161
See application file for complete search history.

(56) References Cited

U.S. PATENT DOCUMENTS

| | | | |
|---|---|---|---|
| 6,086,197 A * | 7/2000 | Kubota et al. | 347/100 |
| 2003/0105187 A1* | 6/2003 | Iijima | 523/160 |
| 2005/0282928 A1* | 12/2005 | Lin et al. | 523/160 |
| 2008/0268156 A1* | 10/2008 | Ueno et al. | 427/288 |

FOREIGN PATENT DOCUMENTS

| | | |
|---|---|---|
| JP | 61-215787 | 9/1986 |
| JP | 2000-256974 | 9/2000 |
| JP | 2001-106951 | 4/2001 |
| JP | 2001-138629 | 5/2001 |
| JP | 2001-140173 | 5/2001 |
| JP | 2003-313483 | 11/2003 |
| JP | 2005-007792 | 1/2005 |
| JP | 2005-161583 | 6/2005 |
| JP | 2006-132034 | 5/2006 |

OTHER PUBLICATIONS

Official Action of Japanese Patent Application No. 2008-063150 issued on Sep. 25, 2012 with related to claiming the same priority of counterpart Japanese Application No. 2007-166532 filed on Jun. 25, 2007.

* cited by examiner

*Primary Examiner* — Manish S Shah
(74) *Attorney, Agent, or Firm* — Nath, Goldberg & Meyer; Jerald L. Meyer; Tanya E. Harkins

(57) ABSTRACT

An ink for inkjet printing including a pigment, a water-dispersible resin, water, and a water-soluble organic solvent, wherein the water-dispersible resin is an anionic resin having a film elongation of 400-1,000%, a tensile strength of 20 to 50 N/mm$^2$ and an absolute value for the zeta potential (mV) of 40 or greater, the amount of the anionic resin, reported as a weight ratio relative to the pigment, is within a range from (0.5 to 2.5)/1, and the surface tension of the ink is within a range from 30 to 50 mN/m.

12 Claims, No Drawings

INK FOR INKJET PRINTING

This is a National Phase Application filed under 35 U.S.C. 371 as a national stage of PCT/JP2008/054988, with the filing date of Mar. 18, 2008, an application claiming priority benefit from Japanese Patent Application No. P2007-166532, filed Jun. 25, 2007, the entire content of each of which is hereby incorporated by reference in its entirety.

TECHNICAL FIELD

The present invention relates to an ink for inkjet printing that can be used for printing using an inkjet recording method, and also relates to a method for producing a printed item that uses the ink.

BACKGROUND ART

Examples of methods that may be used for printing images such as text, pictures or designs onto fabrics such as woven fabrics and nonwoven fabrics include not only screen printing methods and roller printing methods, but more recently inkjet printing methods, in which image processing is conducted using a computer and the image can then be printed without a plate or screen, which are attracting considerable attention.

Inkjet printing methods include transfer methods in which following printing onto a transfer sheet, the image is transferred to the fabric by thermal transfer, iron printing methods in which following printing to a heat-fixable resin film (an iron printing sheet), the resin film is subjected to heat fixing, and direct printing methods in which printing is conducted directly onto the fabric.

Of these methods, direct printing methods, which require no secondary materials such as the transfer sheet required in transfer methods, and which suffer no deterioration in texture such as that produced by iron printing methods, are attracting much attention.

In the case of direct printing methods, for reasons including the fact that inkjet recording inks are of low viscosity and penetrate readily, the fact that the hiding power is inferior in the case of pigment inks due to the small pigment particle size (generally not more than 300 nm), and the fact that the amount of ink applied is small, the image of a printed item tends to be affected by the base color of the fabric, and printing onto dark-colored fabrics such as black or navy blue fabrics has proven problematic.

In order to address this issue, discharge-type direct inkjet printing methods are being developed in which a discharge ink is printed onto the fabric prior to printing, and the desired color ink printing is then performed. However, because the state of the discharge varies depending on the type of fabric, quality stability is problematic. Moreover, completely removing the dye from the fabric is difficult, meaning obtaining vivid coloration is problematic.

Another issue that is unique to printing onto fibrous products is the requirement that images printed onto fabrics used for clothing or the like must exhibit high levels of durability to washing and friction.

In those cases where a pigment is used as the colorant, advantages include a high degree of lightfastness, favorable compatibility with a plurality of fiber types and the fact that a colorant removal step is unnecessary, and the simplicity provided by pigments is very attractive. In order to fix the pigment, a binder component must be added to the ink. However, in the case of an inkjet ink, from the viewpoints of the discharge stability, and the discharge properties and degree of nozzle blocking following sitting within the head, a large amount of the binder component cannot be used, and therefore the durability relative to washing and friction tends to be unsatisfactory.

Japanese Patent Laid-Open No. 2005-161583 discloses a method in which a plurality of printing layers are superimposed on a fabric, wherein temporary heat fixing is conducted at least once during the superimposition of the plurality of printing layers, and a main heat fixing operation is conducted following completion of the final printing operation. This method has an object of imparting superior washing durability, and obtaining a white inkjet image of superior visibility on a dark-colored fabric. However, because of the significant increase in the number of steps required by the plurality of printing operations and the heat fixing and the like, this method still has problems in terms of productivity.

Japanese Patent Laid-Open No. S61-215787 discloses an inkjet recording method that uses two liquids, wherein a reaction liquid comprising a polyvalent metal salt, and an ink composition comprising a pigment and a resin emulsion are printed and adhered to a recording medium. It is disclosed that this method enables printing bleeding and printing irregularities to be suppressed, and effectively prevents color bleeding. However, this method displays inadequate hiding power for printing onto dark-colored fabrics, and further improvements are also required in the durability to washing and friction.

DISCLOSURE OF INVENTION

The present invention has an object of providing an ink for inkjet printing that exhibits favorable washing durability and friction durability properties, and is capable of realizing favorable hiding power even when used on dark-colored fabrics or the like, as well as providing a method for producing a printed item that uses the ink.

One aspect of the present invention relates to an ink for inkjet printing comprising a pigment, a water-dispersible resin, water, and a water-soluble organic solvent, wherein the water-dispersible resin is an anionic resin having a film elongation of 400 to 1,000%, a tensile strength of 20 to 50 N/mm$^2$ and an absolute value for the zeta potential (mV) of 40 or greater; the amount of the anionic resin, reported as a weight ratio relative to the pigment, is within a range from (0.5 to 2.5)/1; and the surface tension of the ink is within a range from 30 to 50 mN/m.

This ink for inkjet printing (hereafter also referred to as simply "the ink") according to the present invention includes both inks in which the pigment is a white pigment (hereafter also referred to as "white ink"), and inks in which the pigment is a colored pigment other than white (hereafter also referred to as "colored ink").

Another aspect of the present invention relates to a method for producing a printed item, comprising: (1) applying a pretreatment agent comprising a polyvalent metal salt to a printing location on an item to be printed, and (2) printing the ink for inkjet printing according to the aspect of the present invention described above using an inkjet recording method.

Yet another aspect of the present invention relates to an ink set for inkjet printing, composed of a combination of a pretreatment agent comprising a polyvalent metal salt, a white ink according to the aspect of the present invention described above, and a colored ink according to the aspect of the present invention described above.

BEST MODE FOR CARRYING OUT THE INVENTION

The ink is a composition comprising a pigment, a water-dispersible resin (a resin emulsion), water, and a water-soluble organic solvent.

The water-dispersible resin that acts as a pigment binder comprises at least an anionic resin having properties including a film elongation of 400 to 1,000%, a tensile strength of 20 to 50 N/mm$^2$ and an absolute value for the zeta potential (mV) of 40 or greater. From the viewpoint of compatibility with an inkjet head material, an anionic resin is selected as the water-dispersible resin.

In order to ensure favorable washing and friction durability on base materials that expand and contract readily such as fabrics, and base materials that require favorable flex resistance such as leather, it is important that the resin coating of the ink (the ink film) undergoes ready expansion and contraction, that is, exhibits favorable film elongation. By using a resin for which the film elongation is at least 300%, the ink film is able to expand and contract together with the fabric, meaning rupture or cracking of the ink film can be prevented, and favorable washing and friction durability properties can be obtained. On the other hand, if the resin elongation exceeds 1,000%, then the adhesion of the ink film to the base material tends to deteriorate, and the washing and friction durability tend to decrease, all of which are undesirable. It is thought that these effects are the result of the elasticity of the ink film becoming overly powerful, meaning a satisfactory anchoring effect on the fiber surface cannot be achieved. The film elongation of the resin is preferably within a range from 400 to 850%.

In terms of the strength of the ink film, the tensile strength of the resin is important. Provided the tensile strength is at least 20 N/mm$^2$, the friction durability can be enhanced, preventing the ink film from being rubbed away by frictional forces. On the other hand, if the tensile strength exceeds 50 N/mm$^2$, then when the ink film is formed, the film tends to become overly hard, resulting in a deterioration in the texture that is undesirable. The tensile strength is preferably at least 30 N/mm$^2$, and is more preferably within a range from 33 to 45 N/mm$^2$.

Moreover, this anionic resin has an absolute value for the zeta potential (mV) of 40 or greater. By ensuring that the resin has this level of zeta potential, the resin precipitates readily upon contact with the polyvalent metal salt, enabling the hiding power and the washing and friction durability properties to be improved.

In terms of ensuring ready precipitation under the action of the polyvalent metal salt when the pretreatment agent is used, the anionic groups within the anionic resin are preferably carboxyl groups.

Specific examples of water-dispersible resins that satisfy the types of properties outlined above include Superflex 460, 470, 610 and 700 from the Superflex series manufactured by Dai-ichi Kogyo Seiyaku Co., Ltd., Neorez R-9660, R-9637 and R-940 from the Neorez series manufactured by Kusumoto Chemicals, Ltd., and Adeka Bontighter HUX-380 and 290K from the Adeka Bontighter series manufactured by Adeka Corporation. These resins are all anionic resins having a urethane skeleton. Urethane resins are preferred as they offer a high degree of freedom in terms of design, meaning the desired film properties can be more readily achieved. Examples of resins that may be used as the urethane resin include polyether-type urethane resins that include ether bonds within the main chain besides the urethane bonds, polyester-type urethane resins that include ester bonds within the main chain besides the urethane bonds, and polycarbonate-type urethane resins that include carbonate bonds within the main chain besides the urethane bonds. Of these, the use of polycarbonate-type urethane resins and polyester-type urethane resins is particularly preferred.

A plurality of anionic resins may be used in combination.

The amount of the anionic resin within the ink, reported as a weight ratio relative to the pigment, is preferably within a range from (0.5 to 2.5)/1. This ensures that the effects of adding the anionic resin manifest satisfactorily. In other words, if the amount of the anion resin relative to the pigment is less than a weight ratio of 0.5/1, then not only is there a possibility that satisfactory washing and friction durability properties may be unattainable, but because the amount of resin that precipitates due to the interaction with the polyvalent metal salt contained within the pretreatment agent decreases, there is also a possibility that adequate hiding power may not be achievable. In contrast, if the weight ratio exceeds 2.5/1, then the anionic resin affects the ink viscosity, and may impair the printability.

A resin other than the water-dispersible resin having the properties prescribed in the present invention may be used in combination with the water-dispersible resin, provided the effects of the present invention are not impaired. In the case of this type of combination of resins, the total amount of resin within the ink, reported as a weight ratio relative to the pigment, is preferably not more than 2.5/1.

The pigment may use any of the pigments typically used within this technical field. A white pigment is used for the white ink, and a colored pigment other than white is used for the colored ink.

Specific examples of the white pigment include inorganic pigments such as titanium oxide, zinc oxide, zinc sulfide, antimony oxide and zirconium oxide. Besides inorganic pigments, hollow resin microparticles and polymer microparticles may also be used.

The average particle size of the pigment is preferably within a range from 100 to 500 nm. If the average particle size of the pigment is less than 100 nm, then the hiding power tends to become inadequate, whereas if the average particle size exceeds 500 nm, the discharge stability tends to deteriorate.

Of the above resins, in terms of hiding power, the use of titanium oxide is preferred. As described above, the average particle size of the titanium oxide is preferably within a range from 100 to 500 nm. In those cases where titanium oxide is used, titanium oxide that has undergone a surface treatment with alumina or silica is preferably used in order to inhibit any photocatalytic action. The amount of this surface treatment preferably represents approximately 5 to 20% by weight of the pigment.

Examples of the colored pigment include organic pigments such as azo-based pigments, phthalocyanine-based pigments, dye-based pigments, condensed polycyclic pigments, nitro-based pigments, and nitroso-based pigments (such as brilliant carmine 6B, lake red C, Watchung red, disazo yellow, Hansa yellow, phthalocyanine blue, phthalocyanine green, alkali blue and aniline black); inorganic pigments, including metals such as cobalt, iron, chromium, copper, zinc, lead, titanium, vanadium, manganese and nickel, as well as metal oxides and sulfides, and yellow ocher, ultramarine and iron blue pigments; and carbon blacks such as furnace carbon black, lamp black, acetylene black, and channel black.

Any one of these pigments may be used alone, or two or more different pigments may be used in combination.

The blend amount of the pigment varies depending on the type of pigment used, although in terms of factors such as ensuring the necessary coloration, the ink preferably includes approximately 1 to 30% by weight of the pigment, and a blend amount of 1 to 15% by weight is more preferred.

A conventional pigment dispersant typified by polymer dispersants and surfactants is preferably used to enable the pigment to be dispersed stably within the ink.

Examples of commercially available products that may be used as a polymer dispersant include the Solsperse series (Solsperse 20000, 27000, 41000, 41090, 43000 and 44000) manufactured by Lubrizol Japan Ltd., the Joncryl series (Joncryl 57, 60, 62, 63, 71 and 501) manufactured by Johnson Polymer, Inc., and polyvinylpyrrolidone K-30 and K-90 manufactured by Dai-ichi Kogyo Seiyaku Co., Ltd.

Examples of the surfactants include anionic surfactants such as the Demol series (Demol N, RN, NL, RNL, and T-45) manufactured by Kao Corporation, and nonionic surfactants such as the Emulgen series (Emulgen A-60, A-90, A-500, B-40, L-40 and 420) manufactured by Kao Corporation.

In consideration of the interaction with the pretreatment agent comprising a polyvalent metal salt, the pigment dispersant is preferably an anionic surfactant.

These pigment dispersants may also be used in combinations containing a plurality of different dispersants.

When a pigment dispersant is used, there are no particular restrictions on the blend amount of the pigment dispersant within the ink, which varies depending on the type of dispersant used, but generally, if reported as a weight ratio of the active ingredient (the solid fraction) relative to the pigment, the amount of the pigment dispersant is preferably within a range from (0.005 to 0.5)/1.

Moreover, self-dispersing pigments in which the pigment surface has been modified with hydrophilic functional groups may also be used. Examples of commercially available products include the CAB-O-JET series (CAB-O-JET T200, 300, 250C, 260M and 270C) manufactured by Cabot Corporation, and CW-1 and CW-2 manufactured by Orient Chemical Industries, Ltd.

Microencapsulated pigments in which the pigment is coated with a resin may also be used.

From the viewpoint of viscosity regulation, the amount of water included in the ink is preferably within a range from 20 to 80% by weight, and is more preferably from 30 to 70% by weight.

Examples of solvents that can be used as the water-soluble organic solvent include organic compounds that are liquid at room temperature and soluble in water. Specific examples of solvents that may be used include lower alcohols such as methanol, ethanol, 1-propanol, isopropanol, 1-butanol, 2-butanol, isobutanol and 2-methyl-2-propanol; glycols such as ethylene glycol, diethylene glycol, triethylene glycol, tetraethylene glycol, pentaethylene glycol, propylene glycol, dipropylene glycol and tripropylene glycol; glycerol; acetins (monoacetin, diacetin and triacetin); glycol derivatives such as triethylene glycol monomethyl ether, triethylene glycol monoethyl ether, triethylene glycol monopropyl ether, triethylene glycol monobutyl ether, tetraethylene glycol monomethyl ether, tetraethylene glycol monoethyl ether, tetraethylene glycol dimethyl ether and tetraethylene glycol diethyl ether; as well as triethanolamine, 1-methyl-2-pyrrolidone, β-thiodiglycol and sulfolane. Low molecular weight polyalkylene glycols, including polyethylene glycol with an average molecular weight within a range from 190 to 630, such as an average molecular weight of 200, 300, 400 or 600, polypropylene glycol diol with an average molecular weight within a range from 200 to 600, such as an average molecular weight of 400, and polypropylene glycol triol with an average molecular weight within a range from 250 to 800, such as an average molecular weight of 300 or 700, can also be used.

These water-soluble organic solvents may be used either alone, or in combinations of two or more different solvents.

From the viewpoints of viscosity regulation and the moisture retention effect, the amount of the water-soluble organic solvent in the ink is preferably within a range from 1 to 80% by weight, and is more preferably from 10 to 60% by weight.

The ink may also include suitable amounts of a wetting agent (moisture retention agent), surface tension regulator (surfactant), antifoaming agent, fixing agent, pH regulator, antioxidant and/or preservative, in addition to the components described above.

Polyhydric alcohols can be used as the wetting agent. Anionic surfactants, cationic surfactants, amphoteric surfactants, nonionic surfactants, or polymer-based, silicone-based or fluorine-based surfactants can be used as the surface tension regulator.

Including a surfactant is preferable, as it enables the ink to be discharged stably using an inkjet method, and also enables the penetrability of the ink to be appropriately controlled. The amount added varies depending on the type of surfactant used, but is preferably within a range from 0.1 to 10% by weight of the ink. If the surfactant is added in a large amount exceeding this range, then the surface tension of the ink decreases, and as a result, there is a possibility that the ink penetration into the item being printed such as a fabric may become overly fast, hindering the hiding power and coloration properties.

Specific examples of the anionic surfactants include the Emal series (Emal 0, 10, 2F, 40 and 20C), the Neopelex series (Neopelex GS, G-15, G-25 and G-65), the Pelex series (Pelex OT-P, TR, CS, TA, SS-L and SS-H), and the Demol series (Demol N, NL, RN and MS), all manufactured by Kao Corporation.

Specific examples of the cationic surfactants include the Acetamin series (Acetamin 24 and 86), the Quartamin series (Quartamin 24P, 86P, 60W and 86W), and the Sanisol series (Sanisol C and B-50), all manufactured by Kao Corporation.

Specific examples of the nonionic surfactants include acetylene glycol-based surfactants such as the Surfynol series (Surfynol 104E, 104H, 420, 440, 465 and 485) manufactured by Air Products and Chemicals, Inc., and polyoxyethylene alkyl ether-based surfactants such as the Emulgen series (Emulgen 102KG, 103, 104P, 105, 106, 108, 120, 147, 150, 220, 350, 404, 420, 705, 707, 709, 1108, 4985 and 2025G) manufactured by Kao Corporation.

Specific examples of the amphoteric surfactants include the Amphitol series (Amphitol 20BS, 24B, 86B, 20YB and 20N) manufactured by Kao Corporation.

An electrolyte may also be added to the ink to regulate the viscosity or the pH of the ink. Examples of the electrolyte include sodium sulfate, potassium hydrogen phosphate, sodium citrate, potassium tartrate and sodium borate, and two or more of these electrolytes may also be used in combination. Compounds such as sulfuric acid, nitric acid, acetic acid, sodium hydroxide, potassium hydroxide, ammonium hydroxide and triethanolamine may also be used as either ink thickening assistants or pH regulators.

By adding an antioxidant to the ink, oxidation of the ink components can be prevented, enabling the storage stability of the ink to be improved. Examples of compounds that may be used as the antioxidant include L-ascorbic acid, sodium L-ascorbate, sodium isoascorbate, potassium sulfite, sodium sulfite, sodium thiosulfate, sodium dithionite and sodium pyrosulfite.

By adding a preservative, decomposition of the ink can be prevented and the storage stability of the ink can be improved. Examples of compounds that may be used as the preservative include isothiazolone-based preservatives such as 5-chloro-2-methyl-4-isothiazolin-3-one, 2-methyl-4-isothiazolin-3-one, 2-n-octyl-4-isothiazolin-3-one and 1,2-benzisothiazolin-3-one; triazine-based preservatives such as hexahydro-1, 3,5-tris(2-hydroxyethyl)-s-triazine; pyridine-based and quinoline-based preservatives such as sodium 2-pyridinethiol 1-oxide and 8-oxyquinoline; dithiocarbamate-based preservatives such as sodium dimethyldithiocarbamate; organobromine-based preservatives such as 2,2-dibromo-3-nitrilopropionamide, 2-bromo-2-nitro-1,3-propanediol, 2,2-dibromo-2-nitroethanol and 1,2-dibromo-2,4-dicyanobutane; as well as methyl p-hydroxybenzoate, ethyl p-hydroxybenzoate, potassium sorbate, sodium dehydroacetate and salicylic acid.

The surface tension of the ink comprising the aforementioned essential components and any of the above optional components as required is preferably within a range from 30 to 50 mN/m. In order to control the ink penetration, it is necessary to penetrates into the item being printed such as a fabric. In those cases where the item being printed is a fabric, if the surface tension of the ink is less than 30 mN/m, then the ink penetration speed increases, and an ink film cannot be formed satisfactorily on the fabric surface. Moreover, in the case of an ink having a low surface tension, the fabric readily absorbs the penetrating ink, meaning the pigment penetrates into the interior of the fabric fibers, making it impossible to hide the color of the base fabric. On the other hand, an ink surface tension that is greater than 50 mN/m is also undesirable, as it causes a deterioration in the discharge properties from the inkjet nozzles.

The ink viscosity may be adjusted as appropriate, although from the viewpoint of the discharge properties, it is preferably within a range from 1 to 30 mPa·s. This viscosity is measured at 23° C. by raising the shear stress from 0 Pa at a rate of 0.1 Pa/s, and refers to the ink viscosity at 10 Pa.

Next is a description of a method for producing a printed item using the ink according to the present invention. Examples of the item to be printed include a fabric, artificial leather or natural leather or the like, and specific examples of the fabric include fabrics formed from various natural or synthetic fibers such as cotton, silk, wool, hemp, Nylon, polyester or rayon. The ink according to the present invention is able to produce a printed item that exhibits superior durability and hiding power on any of a variety of fabric materials or leathers.

The ink is used in combination with a pretreatment agent comprising a polyvalent metal salt, and the item to be printed such as a fabric is treated in advance with the pretreatment agent before being printed with the ink. In other words, the method for producing a printed item comprises: (1) applying a pretreatment agent comprising a polyvalent metal salt to a printing location on an item to be printed, and (2) printing the ink according to the present invention using an inkjet recording method. By using this production method, a printed item having superior coloration and hiding power can be obtained, even on dark-colored fabrics.

The polyvalent metal salt within the pretreatment agent has an action that causes aggregation of the pigment within the ink and precipitation of the resin emulsion, thus causing an ink film to be formed on the item being printed.

The polyvalent metal salt comprises a divalent or higher polyvalent metal ion and an anion. Examples of the divalent or higher polyvalent metal ion include $Ca^{2+}$, $Mg^{2+}$, $Cu^{2+}$, $Ni^{2+}$, $Zn^{2+}$ and $Ba^{2+}$. Examples of the anion include $Cl^-$, $NO_3^-$, $CH_3COO^-$, $I^-$, $Br^-$ and $ClO_3^-$. Specific examples of the salt include calcium nitrate, magnesium nitrate, copper nitrate, calcium acetate and magnesium acetate.

These metal salts may be used alone, or a plurality of different salts may be used in a mixture.

From the viewpoint of enabling satisfactory formation of an ink film, the concentration of the polyvalent metal salt within the pretreatment agent is preferably within a range from 1 to 25% by weight. Even if the concentration is increased beyond 25% by weight, no further effect can be expected.

A water-dispersible resin (a resin emulsion) may be added to the pretreatment agent for the purposes of improving the durability and suppressing fuzzing of the surface of the printed item such as a fabric.

In such cases, in terms of ensuring favorable stability with the co-existent polyvalent metal salt, the water-dispersible resin preferably has an absolute value for the zeta potential (mV) of less than 10. Examples of this type of resin, in the case of urethane resins, include Superflex 500, 6E-2000, E-2500, E-4000 and R-5000 from the Superflex series manufactured by Dai-ichi Kogyo Seiyaku Co., Ltd., and Adeka Bontighter HUX-822 and 830 from the Adeka Bontighter series manufactured by Adeka Corporation. Examples of vinyl acetate resins include Vinyblan 1245L, 2680, 2682 and 2684 manufactured by Nissin Chemical Industry Co., Ltd. Examples of acrylic resins include Voncoat AN-402, R-3310 and R-3360 manufactured by DIC Corporation.

Any of the above water-dispersible resins may be used alone, or a plurality of different resins may be used in combination.

The amount of the water-dispersible resin added to the pretreatment agent is preferably within a range from 1 to 20% by weight in order to ensure that the effects of the resin manifest satisfactorily. If a large amount exceeding 20% by weight is added, then removing the pretreatment agent adhered to non-printed portions by washing becomes difficult, and there is a possibility that the commercial value of the printed item may deteriorate.

The pretreatment agent is an aqueous solution that comprises water, but from the viewpoints of viscosity regulation and a moisture retention effect, a water-soluble organic solvent may also be added. Examples of the types of water-soluble organic solvent that may be used in the pretreatment agent include the same water-soluble organic solvents as those added to the ink described above.

The pretreatment agent may also include the types of additives typically added to inks, including preservatives, viscosity regulators, antioxidants and surfactants.

The surface tension of the pretreatment agent is preferably within a range from 40 to 70 mN/m. If the surface tension of the pretreatment agent is less than 40 mN/m, then the polyvalent metal salt within the pretreatment agent penetrates rapidly into the fabric interior, and there is a possibility that the action of the pretreatment agent on the ink may be inadequate. Moreover, when the ink is then adhered to the fabric, the pretreatment agent tends to cause a reduction in the surface tension of the ink, thereby promoting an undesirable penetration of the ink into the fabric.

In other words, the contact angle between the film surface of the applied pretreatment agent and the ink is preferably within a range from 60 to 100° at times of 0.5 seconds and 5 seconds after droplet application. This enables penetration of the ink to be more appropriately controlled, enabling a favorable level of coloration to be maintained. Although a conventional document that defines the ink contact angle as a way of suppressing bleeding and improving the image resolution has been reported, changes in the contact angle were only controlled in the short period from 0.1 to 1 second. In contrast, the inventors of the present invention discovered that in the case of printing onto a fabric, the level of bleeding and the print density could not be improved simply by controlling changes in the contact angle over this type of short period. In the method for producing a printed item according to the present invention, the combination of the pretreatment agent and the ink is preferably selected as to achieve the type of contact angle mentioned above.

There are no particular restrictions on the method used for applying the pretreatment agent to the item to be printed in step (1), and an arbitrary method such as a spraying method, dipping method, padding method or coating method may be used. An inkjet recording method or screen printing method may also be used.

The pretreatment agent is applied to at least the location to be printed on the item undergoing printing. The pretreatment agent may be applied to the entire item including the location to be printed.

Following the pretreatment of step (1), the printing step (2) of printing the ink using an inkjet recording method is conducted. The inkjet printer may employ any of various printing systems, including a piezo system, electrostatic system or thermal system, and discharges liquid droplets of the ink from the inkjet head based on a digital signal, and adheres the discharged ink droplets to the item being printed, which has already been coated with the pretreatment agent.

When printing is performed on a dark-colored fabric, this printing step preferably includes a step (2-1) that uses a white ink, followed by a step (2-2) that uses a colored ink. This enables a more vivid image to be printed.

In such a case, in order to ensure suitable control of the penetrability of the colored ink, the contact angle between the film surface of the white ink printed in step (2-1) and the colored ink used in step (2-2) is preferably within a range from 50 to 80° at a time 0.5 seconds after droplet application, and within a range from 20 to 70° at a time 2 seconds after droplet application. This contact angle is more preferably within a range from 65 to 80° at a time 0.5 seconds after droplet application. At 2 seconds after droplet application, the contact angle is more preferably within a range from 25 to 70°, and even more preferably from 40 to 70°. Moreover, the contact angle at a time 5 seconds after droplet application is preferably within a range from 30 to 70°. Accordingly, a combination of a white ink and a colored ink that yields these types of contact angles is preferred.

The item being printed is preferably subjected to a heat treatment at approximately 100 to 180° C. following both the application of the pretreatment agent in step (1) and following the printing of step (2). The heat treatment following step (1) is used for drying the water content within the pretreatment agent, meaning that when the ink is subsequently applied, water within the pretreatment agent is prevented from mixing with the ink and causing image bleeding, and fuzzing of the surface of the printed item such as a fabric can be remedied. The heat treatment following step (2) dries the ink and causes the water-dispersible resin to form a film, enabling a strong ink film to be formed. In those cases where step (2) is split into steps (2-1) and (2-2), the heat treatment need only be conducted after step (2-2), and there is no need to conduct a heat treatment between steps (2-1) and (2-2).

There are no particular restrictions on the treatment time, and for example, for the heat treatment following step (1), a treatment at 160° C. for approximately 10 seconds is sufficient, while for the heat treatment following step (2), a treatment at 160° C. for approximately 60 seconds is generally sufficient.

An ink set for inkjet printing according to the present invention comprises a combination of the aforementioned pretreatment agent comprising a polyvalent metal salt, a white ink, and a colored ink. By using this set, a printed image can be produced that exhibits excellent coloration, hiding power, and washing and friction durability, even for dark-colored fabrics.

The ink according to the present invention comprises a predetermined amount of an anionic resin having specific film elongation, surface tension and zeta potential properties as the binder that fixes the pigment to the fabric, and the surface tension of the ink is also controlled, and as a result, superior washing durability and friction durability properties can be realized, and favorable hiding power can be imparted even when a dark-colored fabric is used. This ink can be used in combination with a pretreatment agent comprising a polyvalent metal salt.

The method for producing a printed item according to the present invention uses the above ink according to the present invention and combines this ink with a pretreatment agent comprising a polyvalent metal salt, and the polyvalent metal salt has the effects of causing aggregation of the pigment within the ink and precipitation of the anionic resin, meaning the hiding power, washing durability and friction durability of the fabric (the printed item) can be improved. In other words, it is thought that the resin is precipitated on the fabric and fills any microscopic holes in the fibers, and that by increasing the size of the pigment particles, penetration of the ink into the fibers can be suppressed, meaning an ink film comprising the pigment particles can be formed on the fabric surface, enabling the hiding power and coloration properties, and the durability relative to washing and friction to all be improved.

The ink according to the present invention can be used favorably not only on fabrics, but also on leather that requires favorable flex resistance (namely, an ink film that will not crack on bending), and is able to provide a printed item having superior flexibility and durability.

EXAMPLES

A more detailed description of the present invention is presented below based on a series of examples, although the present invention is in no way limited by these examples. In the following description, the units "% by weight" are recorded simply as "%", and the units "parts by weight" are recorded simply as "parts".

The methods used for measuring the various properties are described below.

<Tensile Strength>

The water-dispersible resin was applied to the surface of a polytetrafluoroethylene sheet, and was then dried for 15 hours at ambient temperature, and subsequently subjected to further drying at 80° C. for 6 hours and then at 120° C. for 20 minutes, so as to obtain a dried film thickness of 500 μm. The resin film was then peeled away from the sheet to complete preparation of a water-dispersible resin film.

Using a Tensilon universal tester RTC-1225A (manufactured by Orientec Co., Ltd.), the film elongation of the obtained resin film was measured at a measurement temperature of 20° C. and a measurement speed of 200 mm/min.

<Film Elongation>

A water-dispersible resin film was prepared in the same manner as that described for the tensile strength measurement, and the film was then stretched under the same measurement conditions as those described above, the length to which the resin film was elongated at the point of rupture was measured, and the length was converted to a percentage and recorded as the elongation.

<Zeta Potential>

The water-dispersible resin was diluted with ion-exchanged water to obtain a solid fraction concentration of 0.1%, and the zeta potential of the water-dispersible resin was then measured using a zeta potentiometer "Zetasizer Nano Z" manufactured by Malvern Instruments Ltd.

<Surface Tension>

The surface tension was measured using a plate-type surface tensiometer "model CBVP-Z" manufactured by Kyowa Interface Science Co., Ltd.

<Contact Angle>

The contact angle was measured using a dynamic contact angle meter "OCA 20" manufactured by DataPhysics Instruments GmbH.

<Preparation of Pretreatment Agent>

15 g of calcium nitrate tetrahydrate, 25 g of "Vinyblan 1245L" manufactured by Nissin Chemical Industry Co., Ltd. (zeta potential: −5.8 mV, solid fraction: 40%), and 60 g of ion-exchanged water were mixed, and the mixture was then passed through a metal mesh with a pore size of 20 μm to remove any foreign matter, thus yielding the pretreatment agent. The static surface tension of the thus obtained pretreatment agent was 40.8 mN/m.

<Preparation of White Pigment Dispersion>

Using 250 g of titanium oxide "R62N" (manufactured by Sakai Chemical Industry Co., Ltd.) as a white pigment, and 10 g (active ingredient: 2.5 g) of "Demol EP" (manufactured by Kao Corporation) as a pigment dispersant, these components were mixed with 740 g of ion-exchanged water, and the resulting mixture was dispersed using a beads mill (model: DYNO-MILL KDL A, manufactured by Shinmaru Enterprises Corporation), under conditions including a 0.5 mmΦ zirconia beads packing rate of 80% and a residence time of 2 minutes, thus yielding a white pigment dispersion.

<Preparation of White Ink>

The components shown in Table 1 and Table 2 were mixed, and any coarse particles were removed using a 5 μm membrane filter, thus completing preparation of a white ink. The surfactant used was "Surfynol 465" manufactured by Air Products and Chemicals, Inc., and the ethylene glycol and glycerol were reagents manufactured by Wako Pure Chemical Industries, Ltd.

TABLE 1

| | | Example 1 | Example 2 | Example 3 | Example 4 | Example 5 | Example 6 | Example 7 | Example 8 |
|---|---|---|---|---|---|---|---|---|---|
| White ink formulation (parts by weight) | Water-dispersible resin (1) (solid fraction: 38% by weight) | 26.3 | 13.2 | 39.5 | 39.5 | | | | |
| | Water-dispersible resin (2) (solid fraction: 38% by weight) | | | | | 26.3 | | | |
| | Water-dispersible resin (3) (solid fraction: 38% by weight) | | | | | | 26.3 | | |
| | Water-dispersible resin (4) (solid fraction: 38% by weight) | | | | | | | 26.3 | |
| | Water-dispersible resin (5) (solid fraction: 30% by weight) | | | | | | | | 33.3 |
| | White pigment dispersion | 40 | 40 | 40 | 30 | 40 | 40 | 40 | 40 |
| | Surfactant | 1 | 1 | 1 | 1 | 1 | 1 | 1 | 1 |
| | Ethylene glycol | 10 | 15 | 5 | 5 | 10 | 10 | 10 | 10 |
| | Glycerol | 10 | 15 | 5 | 5 | 10 | 10 | 10 | 10 |
| | Ion-exchanged water | 12.7 | 15.8 | 9.5 | 19.5 | 12.7 | 12.7 | 12.7 | 5.7 |
| | Total | 100 | 100 | 100 | 100 | 100 | 100 | 100 | 100 |
| White ink properties | Surface tension (mN/m) | 35.5 | 34.3 | 36.1 | 35.9 | 35.7 | 35.5 | 35.7 | 35.5 |
| | Contact angle on pretreatment agent after 0.5 seconds (°) | 93 | 85.4 | 90.2 | 90.3 | 91.3 | 88.7 | 87.8 | 87.2 |
| | Contact angle on pretreatment agent after 5 seconds (°) | 94.2 | 81.4 | 88.9 | 90.7 | 92.1 | 87.2 | 86.6 | 85.9 |
| Printed item evaluation | White ink coloration (OD value) | A (0.14) | B (0.21) | A (0.11) | B (0.15) | A (0.11) | A (0.13) | A (0.13) | A (0.13) |
| | Washing durability | A | B | A | A | A | A | A | A |
| | Dry friction durability | A | A | A | A | A | A | A | A |
| | Wet friction durability | A | B | A | A | A | A | A | A |
| | Cracking upon pulling | A | A | A | A | A | B | A | A |

TABLE 2

| | | Comparative example 1 | Comparative example 2 | Comparative example 3 | Comparative example 4 | Comparative example 5 | Comparative example 6 | Comparative example 7 |
|---|---|---|---|---|---|---|---|---|
| White ink formulation (parts by weight) | Water-dispersible resin (1) (solid fraction: 38% by weight) | 0.66 | 39.5 | 26.3 | | | | |
| | Water-dispersible resin (6) (solid fraction: 32% by weight) | | | | 31.3 | | | |
| | Water-dispersible resin (7) (solid fraction: 45% by weight) | | | | | 22.2 | | |
| | Water-dispersible resin (8) (solid fraction: 30% by weight) | | | | | | 33.3 | |
| | Water-dispersible resin (9) (solid fraction: 40% by weight) | | | | | | | 25 |
| | White pigment dispersion | 40 | 20 | 40 | 40 | 40 | 40 | 40 |
| | Surfactant | 1 | 1 | 4 | 1 | 1 | 1 | 1 |
| | Ethylene glycol | 17.5 | 15 | 8.5 | 10 | 10 | 10 | 10 |
| | Glycerol | 17.5 | 15 | 8.5 | 10 | 10 | 10 | 10 |
| | Ion-exchanged water | 23.34 | 9.5 | 12.7 | 7.7 | 16.8 | 5.7 | 14 |
| | Total | 100 | 100 | 100 | 100 | 100 | 100 | 100 |

TABLE 2-continued

|  |  | Comparative example 1 | Comparative example 2 | Comparative example 3 | Comparative example 4 | Comparative example 5 | Comparative example 6 | Comparative example 7 |
|---|---|---|---|---|---|---|---|---|
| White ink properties | Surface tension (mN/m) | 32 | 35.9 | 28.4 | 35.2 | 35.5 | 35.4 | 35.2 |
|  | Contact angle on pretreatment agent after 0.5 seconds (°) | 85.3 | 90.6 | 40.6 | 92.4 | 85.4 | 90.2 | 85.3 |
|  | Contact angle on pretreatment agent after 5 seconds (°) | 78.1 | 91.3 | * | 92.2 | 52.1 | 89.9 | 53.2 |
| Printed item evaluation | White ink coloration (OD value) | C (0.25) | C (0.25) | C (0.38) | A (0.13) | D (0.74) | A (0.11) | D (0.57) |
|  | Washing durability | C | A | D | D | D | A | ** |
|  | Dry friction durability | A | A | A | A | A | A |  |
|  | Wet friction durability | B | A | C | A | C | A |  |
|  | Cracking upon pulling | B | A | A | C | A | C |  |

\* Penetration had completed at 5 seconds, making measurement impossible
\*\* No ink film formed, making evaluation impossible.

<Preparation of Colored (Black) Ink>

A carbon black self-dispersing pigment ("CW-2" manufactured by Orient Chemical Industries, Ltd., a water-dispersed pigment with a solid fraction of 15%) was used as the colored pigment dispersion.

The components shown in Table 3 were mixed, and any coarse particles were removed using a 5 μm membrane filter, thus completing preparation of a colored ink. The surfactant used was "Surfynol 465" manufactured by Air Products and Chemicals, Inc., and the ethylene glycol and glycerol were reagents manufactured by Wako Pure Chemical Industries, Ltd.

TABLE 3

|  |  | Example 9 | Example 10 | Example 11 | Comparative example 8 |
|---|---|---|---|---|---|
|  | Underlying ink (white ink) formulation | Example 1 | Example 1 | Example 5 | Example 1 |
| Colored ink formulation (parts by weight) | Colored pigment dispersion | 30 | 30 | 30 | 30 |
|  | Water-dispersible resin (1) (solid fraction: 38% by weight) | 24 | 11.84 |  | 11.84 |
|  | Water-dispersible resin (2) (solid fraction: 38% by weight) |  |  | 24 |  |
|  | Ethylene glycol | 7 | 7.5 | 7 | 7.5 |
|  | Glycerol | 7 | 7.5 | 7 | 7.5 |
|  | Surfactant | 1 | 5 | 1 | 8 |
|  | Ion-exchanged water | 31 | 38.16 | 31 | 35.16 |
|  | Total | 100 | 100 | 100 | 100 |
| Colored ink properties | Surface tension (mN/m) | 33.6 | 30.1 | 33.8 | 28.5 |
|  | Contact angle on white ink after 0.5 seconds (°) | 67.2 | 53.1 | 66.4 | 24 |
|  | Contact angle on white ink after 2 seconds (°) | 61.3 | 26.5 | 61 | * |
| Printed item evaluation | Colored ink coloration (OD value) | A (1.41) | B (1.36) | B (1.38) | C (1.20) |
|  | Washing durability | A | A | A | B |
|  | Dry friction durability | A | A | A | A |
|  | Wet friction durability | A | A | A | A |
|  | Cracking upon pulling | A | A | A | A |

\* Penetration had completed at 2 seconds, making measurement impossible

In the tables, the water-dispersible resins (1) to (9) were as follows.

Water-dispersible resin (1): Superflex 460 (manufactured by Dai-ichi Kogyo Seiyaku Co., Ltd., this also applies to other Superflex products below)

Water-dispersible resin (2): Adeka Bontighter HUX-380 (manufactured by Adeka Corporation)

Water-dispersible resin (3): Superflex 460S

Water-dispersible resin (4): Superflex 470

Water-dispersible resin (5): Takelac 6021W (manufactured by Mitsui Chemicals, inc.)

Water-dispersible resin (6): Superflex 420

Water-dispersible resin (7): Superflex 500M

Water-dispersible resin (8): Superflex 150

Water-dispersible resin (9): Superflex R5000

The properties of each water-dispersible resin are shown in Table 4.

TABLE 4

|  | Film elongation (%) | Tensile strength (N/mm$^2$) | Zeta potential (mV) |
|---|---|---|---|
| Water-dispersible resin (1) | 750 | 25 | −61.1 |
| Water-dispersible resin (2) | 500 | 38 | −63.2 |
| Water-dispersible resin (3) | 900 | 30 | −52.0 |
| Water-dispersible resin (4) | 640 | 40 | −47.0 |
| Water-dispersible resin (5) | 750 | 50 | −44 |
| Water-dispersible resin (6) | 290 | 32 | −48.4 |
| Water-dispersible resin (7) | 1100 | 8 | −11.7 |
| Water-dispersible resin (8) | 330 | 45 | −51.0 |
| Water-dispersible resin (9) | 310 | 25 | 17.5 |

Using each of the prepared inks and the pretreatment agent, printing was conducted in the manner described below.

Using a black 100% cotton T-shirt as the fabric, an amount of the pretreatment agent equivalent to 0.4 g per 10 cm×10 cm of fabric was weighed in advance, and was then applied uniformly across the entire surface of the T-shirt using an air brush. Following application, the T-shirt was heat treated at 160° C. for 10 seconds.

Subsequently, the ink was placed in a textile printer MMP813BT manufactured by Mastermind Co., Ltd., solid printing of 90 mm×90 mm was conducted using the white ink at 1440×1440 dpi, and a heat treatment was then performed at 160° C. for 1 minute (examples 1 to 8 and comparative examples 1 to 7).

In examples 9 to 11 and comparative example 8, solid printing of the white ink was performed in the same manner as described above, solid printing of 80 mm×80 mm of the black ink was subsequently conducted on top of the white ink at 1440×720 dpi, and a heat treatment was then performed at 160° C. for 1 minute.

Evaluations of the printed items were performed in the manner described below.

<Coloration (OD Value)>

The OD value of the printed surface was measured using a Macbeth reflection densitometer RD920.

The criteria used for evaluating the white printed items are listed below, and an evaluation of B or better was considered to indicate a practically usable level.
A: less than 0.15
B: 0.15 to 0.24
C: 0.25 to 0.40
D: 0.41 or greater The criteria used for evaluating the black printed items are listed below, and in a similar manner to that described above, an evaluation of B or better was considered to indicate a practically usable level.
A: 1.41 or greater
B: 1.25 to 1.40
C: 1.05 to 1.24
D: 1.04 or less <Washing Durability>

Using a fully automatic washing machine ASW-45A1 manufactured by Sanyo Electric Co., Ltd., each printed item was washed 10 times, and the degree of color fading was evaluated using a discoloration gray scale.
A: level 5
B: level 4 to level 4-5
C: level 3-4 to level 4
D: level 3 or lower <Friction Durability>

Using the methods prescribed in JIS L0849, a type 1 tester was used to perform the tests. The dry friction durability was tested in accordance with the dry test prescribed in JIS L0849, whereas the wet friction durability was tested in accordance with the wet test prescribed in JIS L0849, and in each case, the durability was evaluated using a contamination gray scale.
A: level 4-5 to level 5
B: level 3-4 to level 4
C: level 2-3 to level 3
D: level 2 or lower <Cracking Upon Pulling>

The printed item was pulled lengthwise and crosswise by hand, and was then evaluated for the existence of cracking.
A: no cracking
B: slight cracking
C: obvious cracking The results obtained are summarized in Tables 1 to 3.

In the inks of the examples, favorable coloration and superior levels of washing durability and friction durability were obtained, and the resistance to cracking upon pulling was also favorable.

<Evaluation of Printing to Leather>

Using the above pretreatment agent and the white ink of example 1, printing was conducted on natural leather (buffed cow leather) in the same manner as that described above. The results revealed that no cracking occurred even when the leather was bent, and a printed item having excellent coloration and durability was able to be obtained.

The disclosure of the present invention is related to the subject matter disclosed in prior Japanese Application 2007-166532 filed on Jun. 25, 2007, the entire content of which is incorporated by reference herein.

It should be noted that, besides those already mentioned above, various modifications and variations can be made in the aforementioned embodiments without departing from the novel and advantageous features of the present invention. Accordingly, it is intended that all such modifications and variations are included within the scope of the appended claims.

The invention claimed is:

1. An ink for inkjet printing, comprising a white pigment, a water-dispersible anionic resin, water, and a water-soluble organic solvent, wherein
  the anionic resin has a film elongation of 400 to 1,000%, a tensile strength of 20 to 50 N/mm$^2$ and an absolute value for a zeta potential (mV) of 40 or greater,
  an amount of the anionic resin, reported as a weight ratio relative to the pigment, is within a range from (0.5 to 2.5)/1, and
  a surface tension of the ink is within a range from 30 to 50 mN/m.

2. The ink for inkjet printing according to claim 1, wherein the anionic resin is a urethane resin.

3. An ink set for inkjet printing, comprising a combination of a pretreatment agent comprising a polyvalent metal salt, the ink for inkjet printing according to claim 1, and
  an ink for inkjet printing, comprising a colored pigment other than white, a water-dispersible anionic resin, water, and a water-soluble organic solvent, wherein
  the anionic resin has a film elongation of 400 to 1000%, a tensile strength of 20 to 50 N/mm$^2$ and an absolute value for a zeta potential (mV) of 40 or greater,
  an amount of the anionic resin, reported as a weight ratio relative to the pigment, is within a range from (0.5 to 2.5)/1, and
  a surface tension of the ink is within a range from 30 to 50mN/m.

4. A method for producing a printed item, comprising:
  (1) applying a pretreatment agent comprising a polyvalent metal salt to a printing location on an item to be printed, and
  (2) printing an ink for inkjet printing, comprising a pigment, a water-dispersible anionic resin, water, and a water-soluble organic solvent, wherein
  the anionic resin has a film elongation of 400 to 1,000%, a tensile strength of 20 to 50 N/mm$^2$ and an absolute value for a zeta potential (mV) of 40 or greater,
  an amount of the anionic resin, reported as a weight ratio relative to the pigment, is within a range from (0.5 to 2.5)/1, and
  a surface tension of the ink is within a range from 30 to 50 mN/m.

5. The method for producing a printed item according to claim 4, wherein
step (2) comprises: (2-1) printing a first ink for inkjet printing using an inkjet recording method, wherein the pigment in the first ink jet is a white pigment, followed by (2-2) printing a second ink using an inkjet recording method, wherein the pigment in the second ink is a colored pigment other than white.

6. The method for producing a printed item according to claim 4, wherein the pretreatment agent comprises a water-dispersible resin having an absolute value for a zeta potential (mV) of less than 10.

7. The method for producing a printed item according to claim 4, wherein
a surface tension of the pretreatment agent is within a range from 40 to 70 mN/m, and a contact angle between a surface of a film produced by applying the pretreatment agent in step (1) and the ink for inkjet printing according to claim 1 is within a range from 60 to 100° at times of 0.5 seconds and 5 seconds after droplet application.

8. The method for producing a printed item according to claim 5, wherein
a contact angle between a surface of a film produced by printing the first ink having the white pigment in step (2-1) and the second ink for inkjet printing having the colored pigment other than white is within a range from 50 to 80° at a time 0.5 seconds after droplet application, and is within a range from 20 to 70° at a time 2 seconds after droplet application.

9. The method for producing a printed item according to claim 5, wherein the pretreatment agent comprises a water-dispersible resin having an absolute value for a zeta potential (mV) of less than 10.

10. The method for producing a printed item according to claim 5, wherein
a surface tension of the pretreatment agent is within a range from 40 to 70 mN/m, and a contact angle between a surface of a film produced by applying the pretreatment agent in step (1) and the ink for inkjet printing according to claim 1 is within a range from 60 to 100° at times of 0.5 seconds and 5 seconds after droplet application.

11. The method for producing a printed item according to claim 4, wherein the anionic resin is a urethane resin.

12. The method for producing a printed item according to claim 5, wherein the anionic resin is a urethane resin.

* * * * *